US012288290B2

(12) United States Patent
Zhang et al.

(10) Patent No.: US 12,288,290 B2
(45) Date of Patent: Apr. 29, 2025

(54) METHOD AND APPARATUS FOR GENERATING THREE-DIMENSIONAL POINT CLOUD IMAGE, COMPUTER DEVICE AND STORAGE MEDIUM

(71) Applicant: Black Sesame Technologies Inc., San Jose, CA (US)

(72) Inventors: Yicheng Zhang, Shanghai (CN); Yanhui Zhang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 492 days.

(21) Appl. No.: 17/703,541

(22) Filed: Mar. 24, 2022

(65) Prior Publication Data

US 2022/0309746 A1 Sep. 29, 2022

(30) Foreign Application Priority Data

Mar. 29, 2021 (CN) .......................... 202110335330.6

(51) Int. Cl.
*G06T 17/00* (2006.01)
*G06T 7/80* (2017.01)

(52) U.S. Cl.
CPC ................ *G06T 17/00* (2013.01); *G06T 7/85* (2017.01); *G06T 2200/04* (2013.01);
(Continued)

(58) Field of Classification Search
CPC ....... G06T 17/00; G06T 7/85; G06T 2200/04; G06T 2200/08; G06T 2207/10024; G06T 2207/10028; G06T 2207/10048; G06T 2207/30204
See application file for complete search history.

(56) References Cited

U.S. PATENT DOCUMENTS 10,666,934 B1  5/2020  Wang et al.
2019/0392598 A1  12/2019  Liu et al.

FOREIGN PATENT DOCUMENTS

CN  103559736 A  2/2014
CN  103976756 A  8/2014
(Continued)

OTHER PUBLICATIONS

Tiancheng Hu, Sumit Jha and Carlos Busso, Robust Driver Head Pose Estimation in Naturalistic Conditions from Point-Cloud Data, 2020 IEEE Intelligent Vehicles Symposium(IV), Jan. 8, 2021.
(Continued)

*Primary Examiner* — Edward F Urban
*Assistant Examiner* — Ashley L. Hytrek
(74) *Attorney, Agent, or Firm* — Timothy Wang; Ni, Wang & Massand, PLLC

(57) ABSTRACT

A method and an apparatus for generating a three-dimensional point cloud image, a computer device and a storage medium. The method comprises: detecting three-dimensional shape coordinates of a three-dimensional object in an infrared camera coordinate system; detecting three-dimensional marker coordinates of the marker set in a marker measurement coordinate system at the same time; obtaining, according to a pre-stored first conversion relationship and a second conversion relationship parameter, three-dimensional color coordinates in the infrared camera coordinate system on the basis of the three-dimensional marker coordinates in the marker measurement coordinate system; and generating a three-dimensional point cloud image of the three-dimensional object in the infrared camera coordinate system by combining the three-dimensional shape coordinates and the three-dimensional color coordinates of the three-dimensional object in the infrared camera coordinate system.

10 Claims, 7 Drawing Sheets

(52) U.S. Cl.
CPC ............... *G06T 2200/08* (2013.01); *G06T 2207/10024* (2013.01); *G06T 2207/10028* (2013.01); *G06T 2207/10048* (2013.01); *G06T 2207/30204* (2013.01)

(56) References Cited

FOREIGN PATENT DOCUMENTS

| CN | 110264567 A |   | 9/2019 |              |
|----|-------------|---|--------|--------------|
| CN | 111445385 B | * | 6/2023 | G06T 3/0043  |
| JP | 2018025551 A | * | 2/2018 | G01B 11/00  |

OTHER PUBLICATIONS

Xu, T.; An, D.; Jia, Y.; Yue, Y. A Review: Point Cloud-Based 3D Human Joints Estimation. Sensors 2021, 21, 1684. https://doi.org/10.3390/s21051684.

Erdal Özbay, Ahmet çinar, A voxelize structured refinement method for registration of point clouds from Kinect sensors, Engineering Science and Technology an International Journal 22(2), Oct. 2018.

Wang Peng, Shi Ruize, Zhong Xiaofeng, Sun Changku, 3D scanning measurement system based on double-line projectionand the line-plane constraint, Infrared and Laser Engineering vol. 46 No. 4, Apr. 2017.

Chongru Li, Research on 3D Reconstruction and Motion Estimation Methods Based on Structured Light Vision, China Thesis's Full-text Databases, 2020, China.

* cited by examiner

METHOD AND APPARATUS FOR GENERATING THREE-DIMENSIONAL POINT CLOUD IMAGE, COMPUTER DEVICE AND STORAGE MEDIUM

CROSS-REFERENCE TO RELATED APPLICATIONS

The application claims priority to Chinese Patent Application No. 202110335330.6, filed on Mar. 29, 2021, the entire contents of which are incorporated herein by reference.

TECHNICAL FIELD

The present disclosure relates to the technical field of three-dimensional reconstruction, and in particular, to a method and an apparatus for generating a three-dimensional point cloud image, a computer device, and a storage medium.

BACKGROUND

In the three-dimensional reconstruction technology, information of a three-dimensional object in a scene may be obtained by means of a specific device, and the information is analyzed and processed, so as to determine three-dimensional information of the three-dimensional object.

For example, information of a three-dimensional object such as a human face may be acquired by means of a special device (e.g., a depth-of-field RGBD camera or a laser scanner) so as to generate a three-dimensional point cloud image of the three-dimensional object. There are usually two methods for acquiring and generating a three-dimensional point cloud image by means of the RGBD camera: one method is based on binocular stereo vision, which performs three-dimensional reconstruction on a three-dimensional object by calculating the disparity of left and right cameras with respect to the three-dimensional object and calibration parameters of the left and right cameras, so as to generate a three-dimensional point cloud image of the three-dimensional object; and the other method is based on the structured light stereo vision technology, which projects encoded structured light onto a reconstructed three-dimensional object, then decodes light information on the surface of the three-dimensional object which is captured by a camera, and then obtains a corresponding disparity according to calibration parameters between the camera and a structured light generation device, and then applies a reconstruction algorithm to the three-dimensional object so as to generate a three-dimensional point cloud image of the three-dimensional object. The laser scanner obtains the distance of a corresponding point mainly by calculating a time difference between emitting a laser to a three-dimensional object and receiving a laser reflected from the three-dimensional object, so that three-dimensional coordinates of three-dimensional reconstruction points of the entire three-dimensional object can be obtained, and then a corresponding three-dimensional point cloud image can be generated.

In the described methods for generating a three-dimensional point cloud image of a three-dimensional object, since the described special device can only acquire complete and high-quality information of a three-dimensional object within a given angular distance range facing the device, when the three-dimensional object is blocked or beyond the given angular distance range of the device due to motion or other objects, the device cannot acquire complete and high-quality information, and thus cannot generate a complete and high-quality three-dimensional point cloud image. Therefore, in order to ensure that a complete three-dimensional point cloud image can be generated during the motion of a three-dimensional object, the motion of the three-dimensional object needs to be limited to a given angular distance range, resulting in a low motion flexibility of the three-dimensional object during real-time tracking and generation of the three-dimensional point cloud image

SUMMARY

On this basis, it is necessary to provide with regard to the described technical problem a method and an apparatus for generating a three-dimensional point cloud image, a computer device and a storage medium, which can still perform real-time tracking and reconstruction on a three-dimensional point cloud image of a three-dimensional object in the case where the three-dimensional object is blocked in a motion process, so as to improve the motion flexibility of the three-dimensional object during real-time tracking and generation of the three-dimensional point cloud image.

In some embodiments, a method for generating a three-dimensional point cloud image is provided, comprising:

detecting, by an infrared camera, three-dimensional shape coordinates of a three-dimensional object in an infrared camera coordinate system at a first time, and in the case where the three-dimensional object and a marker set form a first rigid body, detecting, by a marker measurement device, three-dimensional marker coordinates of the marker set in a marker measurement coordinate system at the first time, the marker set comprising a plurality of markers; determining, according to a pre-stored first conversion relationship parameter between the three-dimensional marker coordinates of the marker set and three-dimensional color coordinates of the three-dimensional object, and the three-dimensional marker coordinates of the marker set in the marker measurement coordinate system at the first time, three-dimensional color coordinates of the three-dimensional object in the marker measurement coordinate system at the first time; converting, according to a pre-stored second conversion relationship parameter between the marker measurement coordinate system and the infrared camera coordinate system, the three-dimensional color coordinates of the three-dimensional object in the marker measurement coordinate system at the first time, so as to obtain three-dimensional color coordinates of the three-dimensional object in the infrared camera coordinate system at the first time; and generating a three-dimensional point cloud image of the three-dimensional object in the infrared camera coordinate system at the first time by combining the three-dimensional shape coordinates of the three-dimensional object in the infrared camera coordinate system at the first time and the three-dimensional color coordinates of the three-dimensional object in the infrared camera coordinate system at the first time.

In some embodiments, an apparatus for generating a three-dimensional point cloud image is provided, comprising:

a data detection module, configured to detect, by an infrared camera, three-dimensional shape coordinates of a three-dimensional object in an infrared camera coordinate system at a first time, and in the case where the three-dimensional object and a marker set form a first rigid body, detect, by a marker measurement device, three-dimensional marker coordinates of the marker set in a marker measurement coordinate system at the first time, the marker set comprising a plurality of markers;

a first coordinate conversion module, configured to determine, according to a pre-stored first conversion relationship parameter between the three-dimensional marker coordinates of the marker set and three-dimensional color coordinates of the three-dimensional object, and the three-dimensional marker coordinates of the marker set in the marker measurement coordinate system at the first time, three-dimensional color coordinates of the three-dimensional object in the marker measurement coordinate system at the first time;

a second coordinate conversion module, configured to convert, according to a pre-stored second conversion relationship parameter between the marker measurement coordinate system and the infrared camera coordinate system, the three-dimensional color coordinates of the three-dimensional object in the marker measurement coordinate system at the first time, so as to obtain three-dimensional color coordinates of the three-dimensional object in the infrared camera coordinate system at the first time; and a three-dimensional point cloud image generation module, configured to generate a three-dimensional point cloud image of the three-dimensional object in the infrared camera coordinate system at the first time by combining the three-dimensional shape coordinates of the three-dimensional object in the infrared camera coordinate system at the first time and the three-dimensional color coordinates of the three-dimensional object in the infrared camera coordinate system at the first time.

In some embodiments, a computer device is provided, comprising a memory and a processor, wherein the memory stores a computer program, and when the processor executes the computer program, the steps of the method for generating a three-dimensional point cloud image according to any one of the described embodiments are implemented.

In some embodiments, a computer-readable storage medium is provided, on which a computer program is stored, wherein the computer, when executed by a processor, implements the steps of the method for generating a three-dimensional point cloud image according to any one of the described embodiments.

According to the method and the apparatus for generating a three-dimensional point cloud image, the computer device and the storage medium, during tracking of a three-dimensional object, a two-dimensional color image of the three-dimensional object does not need to be obtained, and detection of three-dimensional coordinates by an infrared camera and a marker will not be blocked by motion or other objects. Therefore, even if the three-dimensional object is blocked, a complete three-dimensional point cloud image of the three-dimensional object can also be reconstructed, without being limited by an acquisition viewing angle distance range of a color camera. Thus, the limitation to the motion range of a three-dimensional object during the tracking and reconstruction of a three-dimensional point cloud image is reduced, and the flexibility of detection and three-dimensional reconstruction of a moving three-dimensional object is effectively improved.

DETAILED DESCRIPTION OF THE EMBODIMENTS

To make the object, technical solution and advantages of the present disclosure clearer, the present disclosure is further described in detail below with reference to the accompanying drawings and embodiments. It should be understood that the specific embodiments described here are only used to explain the present disclosure and are not limitative of the present disclosure.

In a method for generating a three-dimensional point cloud image, an RGBD camera may respectively sense, by means of a color camera (RGB camera) and an infrared camera (IR camera) built therein, a target three-dimensional object at the same time, so as to obtain a two-dimensional color image representing a color feature of the three-dimensional object and three-dimensional shape coordinates representing a shape feature of the three-dimensional object at the same time; and then, according to a given mapping relationship algorithm, the two-dimensional color image is correspondingly mapped to the three-dimensional shape coordinates, so as to generate a three-dimensional point cloud image capable of representing the color feature and the shape feature of the three-dimensional object at the same time.

However, during real-time tracking and reconstruction of a three-dimensional point cloud image of a dynamic three-dimensional object by using the described method, since a color camera can only acquire a two-dimensional color image within a given viewing angle distance range facing the camera, when the three-dimensional object is blocked or beyond the viewing angle distance range of the color camera due to motion or other objects, the color camera cannot acquire a two-dimensional color image having a complete color feature of the three-dimensional object. Taking the three-dimensional object being a human face as an example, when the human face faces to the color camera sideways or back faces to the color camera, the color camera cannot acquire a complete two-dimensional color image of the human face, thereby causing that a complete three-dimensional point cloud image cannot be generated.

Therefore, the present disclosure provides a method for generating a three-dimensional point cloud image, so as to solve the described problem, thereby reducing the limitation to the motion range of a three-dimensional object during the tracking and reconstruction of a three-dimensional point cloud image, and effectively improving the flexibility of detection and three-dimensional reconstruction of a moving three-dimensional object.

Figure 1:
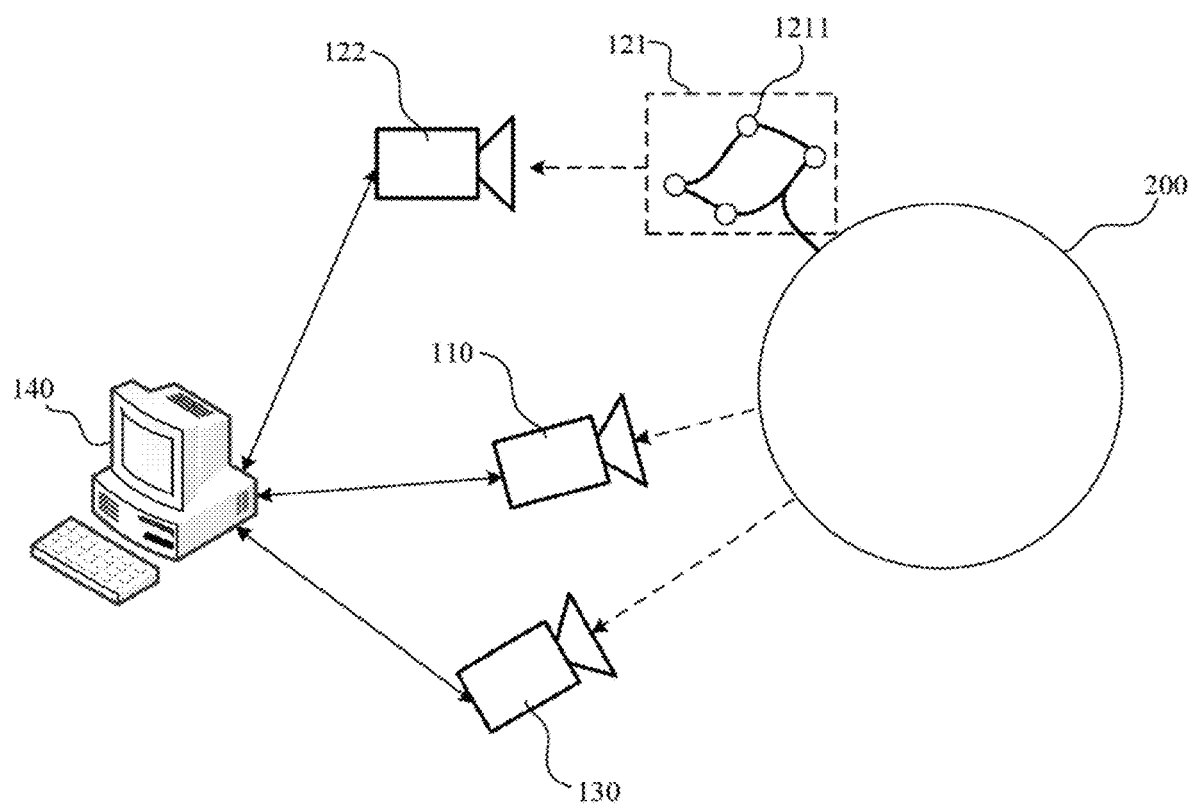
FIG. 1 is an application environment diagram of a method for generating a three-dimensional point cloud image according to an embodiment.

The method for generating a three-dimensional point cloud image provided in the present disclosure may be applied to a system 100 for generating a three-dimensional point cloud image as shown in FIG. 1. The three-dimensional point cloud image generation system 100 comprises a color camera 110, a dynamic capture system 120, an infrared camera 130 and a computer device 140, wherein the computer device 140 is communicatively connected to the color camera 110, the dynamic capture system 120 and the infrared camera 130 respectively.

The color camera 110 may be a device capable of acquiring a two-dimensional color image that is formed by reflecting visible light by a three-dimensional object 200 and represents a color feature of the three-dimensional object 200 to be measured, and calculating, by means of a built-in algorithm and on the basis of the two-dimensional color image and an inherent three-dimensional conversion relationship parameter of the two-dimensional color image, three-dimensional color coordinates of the three-dimensional object 200 in the color camera coordinate system (R coordinate system), wherein the color camera coordinate system is a coordinate system based on the color camera, and the three-dimensional coordinates of the color camera in the color camera coordinate system is a constant value. The color camera 110 may then transmit the three-dimensional color coordinates to the computer device 140. Exemplarily, the color camera 110 may be implemented by a built-in color camera of an RGBD camera. The RGBD camera may acquire a two-dimensional color image of the three-dimensional object 200 by means of the built-in color camera of the RGBD camera, and convert the two-dimensional color image into three-dimensional color coordinates in a coordinate system of the built-in color camera. Alternatively, the color camera 110 may also be implemented by an RGB camera. In an alternative embodiment, the color camera 110 may also acquire a two-dimensional color image of the three-dimensional object 200, and then transmit the acquired two-dimensional color image to the computer device 140, and the computer device 140 calculates and determines three-dimensional color coordinates of the three-dimensional object 200 in the color camera coordinate system on the basis of the two-dimensional color image and a three-dimensional conversion relationship parameter inherent to the color camera 110.

The dynamic capture system 120 comprises a marker set 121 composed of a plurality of markers 1211 and a marker measurement device 122. The marker measurement device 122 can sense the position of each marker 1211 in the marker set 121 in real time, i.e. sensing three-dimensional marker coordinates of each marker 1211 in the marker measurement coordinate system (M coordinate system), wherein the marker measurement coordinate system is a coordinate system based on a marker measurement device, and the three-dimensional coordinates of the marker measurement device in the marker measurement coordinate system are a constant value. The marker measurement device 122 may then transmit the three-dimensional marker coordinates of each marker 1211 to the computer device 140. In the embodiments of the present disclosure, the marker measurement device 122 does not sense the position of a marker 1211 by detecting that the marker 1211 reflects visible light, but senses the position of a marker 1211 by means of independent of visible light reflection, thereby avoiding that the position of the marker 1211 cannot be sensed because the visual field of the visible light is blocked. Exemplarily, the marker measurement device 122 may comprise an IR camera, for example, the marker measurement device 122 may also be implemented by using an RGBD camera. The markers 1211 can reflect/emit infrared rays. The marker measurement device 122 calculates a disparity map by detecting, through the IR camera comprised therein, the infrared rays reflected/emitted by the markers 1211, so as to determine position coordinates of the markers 1211. For another example, each marker 1211 in the marker set 121 may also be a position sensor, and the position sensor senses its own position and transmits same to the marker measurement device 122, etc.

The infrared camera 130 is a device capable of acquiring infrared light reflected/emitted by the three-dimensional object 200, and determining, by means of disparity map calculation, three-dimensional shape coordinates in the infrared camera coordinate system (I coordinate system) that represent a shape feature of the three-dimensional object 200 to be measured, wherein the infrared camera coordinate system is a coordinate system based on the infrared camera, and the three-dimensional coordinates of the infrared camera in the infrared camera coordinate system are a constant value. The infrared camera 130 may then transmit the three-dimensional shape coordinates to the computer device 140.

The computer device 140 may be any device having a calculation function required for implementing the method for generating a three-dimensional point cloud image in the present disclosure. The method for generating a three-dimensional point cloud image of the present disclosure may be divided into a pre-calibration stage and an actual operation stage. When tracking and three-dimensional reconstruction need to be performed on the three-dimensional object 200, in the pre-calibration stage, the computer device 140 may pre-calibrate and store, by using the color camera 110, the dynamic capture system 120 and the infrared camera 130, a first conversion relationship parameter between three-dimensional marker coordinates of the marker set 121 and three-dimensional color coordinates of the three-dimensional object 200, and a second conversion relationship parameter between a marker measurement coordinate system and an infrared camera coordinate system. After the pre-calibration stage is completed, in the actual operation stage, the color camera 110 may be turned off, and the computer device 140 may acquire, by using the dynamic capture system 120 and the infrared camera 130, a coordinate point set and information of the three-dimensional object 200, and generate a three-dimensional point cloud image of the three-dimensional object 200 by combining the pre-stored first conversion relationship parameter and second conversion relationship parameter.

The embodiments of the present disclosure provide a method for generating a three-dimensional point cloud image. The method for generating a three-dimensional point cloud image may be applied to a system for generating a three-dimensional point cloud image in FIG. 1, and is executed by a computer device in FIG. 1. The method for generating a three-dimensional point cloud image may comprise a pre-calibration stage and an actual operation stage.

Figure 2:
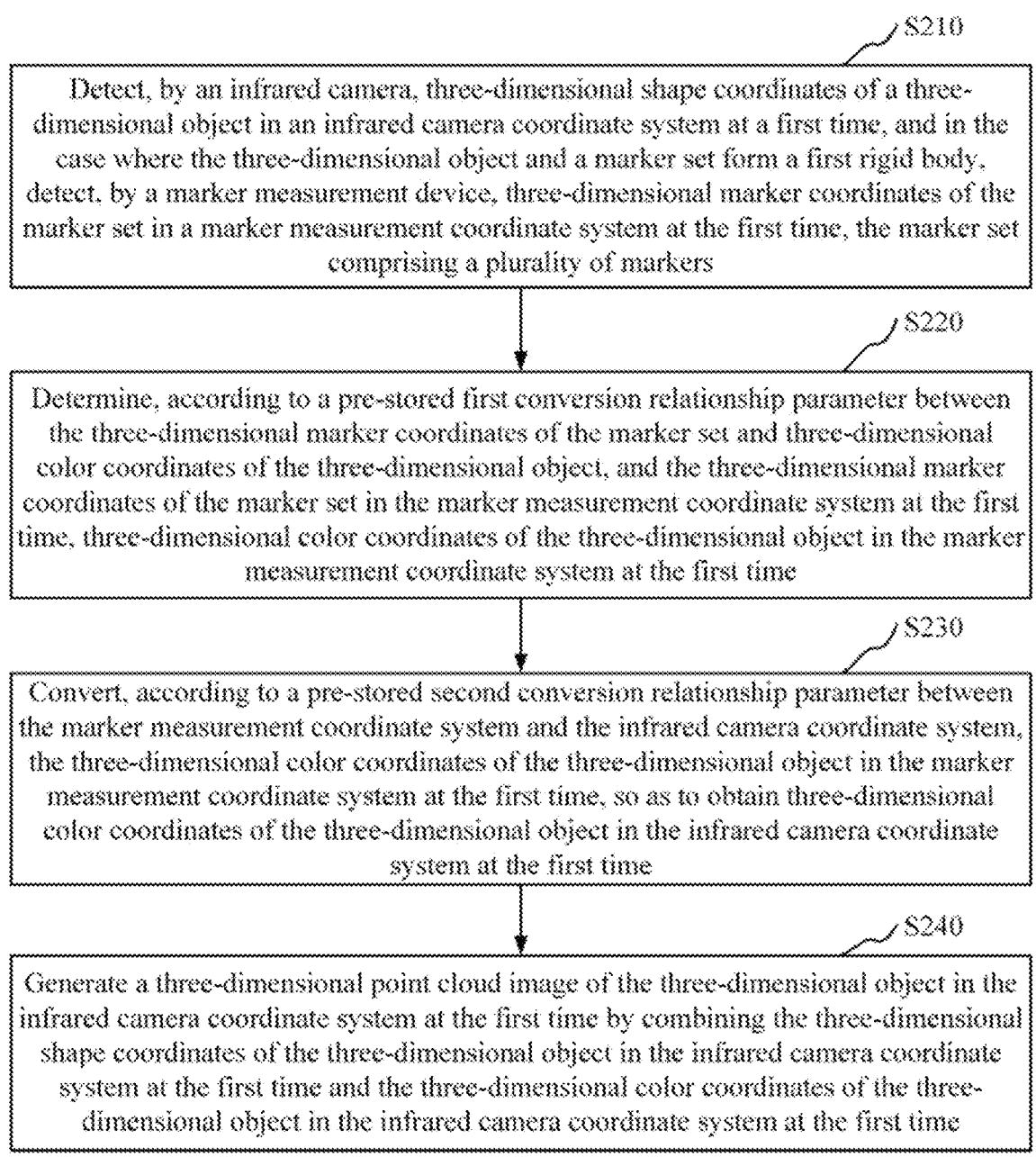
FIG. 2 is a schematic flowchart of a method for generating a three-dimensional point cloud image according to an embodiment.

In some embodiments, as shown in FIG. 2, in the actual operation stage, the method for generating a three-dimensional point cloud image of the present disclosure comprises the following steps S210 to S240.

In step S210, three-dimensional shape coordinates of a three-dimensional object in an infrared camera coordinate system at a first time are detected by using an infrared camera, and in the case where the three-dimensional object and a marker set form a first rigid body, three-dimensional marker coordinates of the marker set in a marker measurement coordinate system at the first time are detected by using a marker measurement device, the marker set comprising a plurality of markers.

In this step, a computer device controls the infrared camera and the marker measurement device to detect the three-dimensional shape coordinates and the three-dimensional marker coordinates at the same first time, so as to ensure that the three-dimensional shape coordinates correspond to the three-dimensional marker coordinates.

In some embodiments, the first rigid body is composed of a first sub-rigid body and a three-dimensional object, and the first sub-rigid body is formed by arranging the plurality of markers comprised in the marker set in a non-collinear manner at a predetermined position of the three-dimensional object. The number of markers comprised in the marker set may be set according to actual needs, and preferably, the number of markers is greater than or equal to four.

In the embodiments of the present disclosure, the three-dimensional object is a target object to be monitored, and the three-dimensional object may be, for example, a human face, a gaze, or another target object that needs to be monitored. The rigid body refers to an object of which the relative position between internal constituent components thereof is fixed. Taking the first rigid body as an example, the relative position between the first sub-rigid body and the three-dimensional object in the first rigid body is fixed, and the relative position between the plurality of markers in the first sub-rigid body is also fixed. The three-dimensional shape coordinates comprise three-dimensional coordinate values corresponding to various points in a point cloud composed of points distributed at a predetermined density on the surface of the three-dimensional object in a given three-dimensional space coordinate system. The three-dimensional marker coordinates comprise three-dimensional coordinate values of various markers in the given three-dimensional space coordinate system.

Taking the three-dimensional object being a human face as an example, in this step, N markers of the marker set may be fixed on a rigid support in a non-collinear manner to form a head-mounted marker support serving as the first sub-rigid body, and a user wears the head-mounted marker support such that the human face of the user and the head-mounted marker support form the first rigid body. Under the control of the computer device, the infrared camera detects the three-dimensional shape coordinates of the three-dimensional object in the infrared camera coordinate system (I coordinate system) and transmits same to the computer device; and at the same time, the marker measurement device detects the three-dimensional marker coordinates of the N markers in the marker set in the marker measurement coordinate system (M coordinate system) and transmits same to the computer device. The computer device may obtain the three-dimensional marker coordinates of the N markers in the marker measurement coordinate system by means of an API provided by a dynamic capture system.

In step S220, according to a pre-stored first conversion relationship parameter between the three-dimensional marker coordinates of the marker set and three-dimensional color coordinates of the three-dimensional object, and the three-dimensional marker coordinates of the marker set in the marker measurement coordinate system at the first time, three-dimensional color coordinates of the three-dimensional object in the marker measurement coordinate system at the first time is determined.

In the embodiments of the present disclosure, the three-dimensional color coordinates refer to three-dimensional coordinates corresponding to a two-dimensional color image of the three-dimensional object which is acquired by a color camera in the given three-dimensional space coordinate system. The three-dimensional color coordinates comprise, for example, a pixel value (e.g. an RGB value) of each pixel point in the two-dimensional color image in the given three-dimensional space coordinate system and a three-dimensional coordinate value corresponding to each pixel point.

Before step S220, the computer device pre-calibrates and stores the first conversion relationship parameter between the three-dimensional marker coordinates of the marker set and the three-dimensional color coordinates of the three-dimensional object.

In some embodiments, the first conversion relationship parameter in step S220 comprises a first conversion relationship matrix between the three-dimensional marker coordinates of the N markers comprised in the marker set and three-dimensional coordinates of N pixel points at the given positions in the two-dimensional color image of the three-dimensional object, and the pixel value of each pixel point in the two-dimensional color image. Step S220 comprises:

in step S221, according to the pre-stored first conversion relationship matrix between the three-dimensional marker coordinates of the N markers comprised in the marker set and the three-dimensional coordinates of the N pixel points at the given positions in the two-dimensional color image of the three-dimensional object, and the three-dimensional marker coordinates of the marker set in the marker measurement coordinate system at the first time, three-dimensional coordinates of the N pixel points at the given positions in the two-dimensional color image of the three-dimensional object in the marker measurement coordinate system at the first time are determined.

The N pixel points at the given positions in the two-dimensional color image refer to N pixel points at N fixed positions in the two-dimensional color image. In the first rigid body, the N pixel points are in one-to-one correspondence with the N markers to form a rigid body.

The computer device pre-stores the first conversion relationship matrix $[K_{LM}, T_{LM}]$, so that in this step, in the case where the first conversion relationship matrix $[K_{LM}, T_{LM}]$ is known, the corresponding three-dimensional coordinates $X_{L,1 \sim N}$ of the N pixel points in the marker measurement coordinate system at the first time may be obtained by means of conversion on the basis of the obtained three-dimensional marker coordinates $X_{M,1 \sim N}$ of the N markers comprised in the marker set in the marker measurement coordinate system at the first time according to formula (1):

$$\Sigma_i^N (x_{Li}, y_{Li}, z_{Li})^T = \Sigma_i^N (x_{Mi}, y_{Mi}, z_{Mi})^T * K_{LMi} + T_{LMi} \qquad (1)$$

where $X_{M,1 \sim N} = [x_{M,1}^T, \ldots, x_{M,i}^T, \ldots, x_{M,N}^T]$, and $X_{L,1 \sim N} = [x_{L,1}^T, \ldots, x_{L,i}^T, \ldots, x_{L,N}^T]$.

In formula (1), $X_{M,1 \sim N}$ represents a total coordinate matrix of the N markers in the marker measurement coordinate system at the first time, represents a total coordinate matrix of the N pixel points in the marker measurement coordinate system at the first time, $x_{M,i} = (x_{Mi}, y_{Mi}, z_{Mi})$ represents three-dimensional coordinates of the ith marker among the N markers in the marker measurement coordinate system at the first time, and $x_{Li} = (x_{Li}, y_{Li}, z_{Li})$ represents three-dimensional coordinates of the ith pixel point among the N pixel points in the marker measurement coordinate system at the first time, and superscript T represents transposition.

In step S222, according to the three-dimensional coordinates of the N pixel points at the given positions in the two-dimensional color image of the three-dimensional object in the marker measurement coordinate system at the first time and the pre-stored pixel value of each pixel point in the two-dimensional color image, the three-dimensional color coordinates of the three-dimensional object in the marker measurement coordinate system at the first time are obtained.

In this step, in the case where the three-dimensional coordinates $X_{L,1\sim N}$ of the N pixel points at the given positions in the two-dimensional color image in the marker measurement coordinate system at the first time are determined, the three-dimensional coordinates of all P pixel points of the three-dimensional object in the marker measurement coordinate system at the first time may be determined by combining the pre-stored pixel value of each pixel point in the two-dimensional color image and the pre-stored relative position relationship of each pixel point. Then, the three-dimensional color coordinates of the three-dimensional object in the marker measurement coordinate system at the first time may be determined by combining the three-dimensional coordinates of the P pixel points in the marker measurement coordinate system and the pixel values of the P pixel points at the first time.

Taking N being 4 as an example, the N pixel points may be, for example, four pixel points fixedly located at four corners of a rectangular two-dimensional color image, and the four pixel points are in one-to-one correspondence with four markers of the marker set to form a rigid body, so that the relative position between each pixel point and the corresponding marker is unchanged. Three-dimensional coordinate values of the four markers in the marker measurement coordinate system may be measured according to the formula above, where $[K_{LM}, T_{LM}]$ contains information of four transformation matrixes between the four pixel points and the corresponding four markers of the marker set, so that three-dimensional coordinates of the four markers in the marker measurement coordinate system are determined by respectively converting the three-dimensional coordinates of the four pixel points in the marker measurement coordinate system using $[K_{LM}, T_{LM}]$. However, since the two-dimensional color image is pre-stored, i.e. the relative position relationships of all the P pixel points of the two-dimensional color image and the pixel value of each pixel point being pre-stored, in the case where the three-dimensional coordinates of the four pixel points at the four corners of the two-dimensional color image in the marker measurement coordinate system are determined, the pixel value (e.g. an RGB value) of each pixel point in the two-dimensional color image and the three-dimensional coordinates of each pixel point in the marker measurement coordinate system may be further determined, and thus the three-dimensional color coordinates of the three-dimensional object in the marker measurement coordinate system are determined.

In some embodiments, the first conversion relationship parameter in step S220 comprises three-dimensional color coordinates of the three-dimensional object in a first rigid body coordinate system and three-dimensional marker coordinates of the marker set in the first rigid body coordinate system. Step S220 comprises:

in step S223, according to the pre-stored three-dimensional marker coordinates of the marker set in the first rigid body coordinate system and the three-dimensional marker coordinates of the marker set in the marker measurement coordinate system at the first time, a fourth conversion relationship matrix between the first rigid body coordinate system and the marker measurement coordinate system at the first time is calibrated.

Exemplarily, the pre-stored three-dimensional marker coordinates $X_{Mo1,1\sim N}$ of the N markers comprised in the marker set in the first rigid body coordinate system and the three-dimensional marker coordinates $X_{M,1\sim N}$ of the N markers comprised in the marker set in the marker measurement coordinate system at the first time meet the following conversion relationship:

$$X_{M,1\sim N}=X_{Mo1,1\sim N}*K_{Mo1M}+T_{Mo1M} \quad (2)$$

where $X_{M,1\sim N}=[x_{M,1}{}^T, \ldots, x_{M,i}{}^T, \ldots, x_{M,N}{}^T]$, and $X_{Mo1,1\sim N}=[x_{Mo1,1}{}^T, \ldots, x_{Mo1,i}{}^T, \ldots, x_{Mo1,N}{}^T]$.

In formula (2), $X_{M,1\sim N}$ represents a total coordinate matrix of the N markers in the marker measurement coordinate system at the first time, $X_{mo1,1\sim N}$ represents a total coordinate matrix of the N markers in the first rigid body coordinate system, $x_{M,i}=(x_{Mi}, y_{Mi}, z_{Mi})$ represents three-dimensional coordinates of the ith marker among the N markers in the marker measurement coordinate system at the first time, and $x_{Mo1,i}=(x_{Mo1i}, y_{Mo1i}, z_{Mo1i})$ represents three-dimensional coordinates of the ith marker among the N markers in the first rigid body coordinate system.

The fourth conversion relationship matrix $[K_{Mo1M}, T_{Mo1M}]$ at the first time may be obtained by solving formula (2).

In step S224, the three-dimensional color coordinates of the three-dimensional object in the first rigid body coordinate system are converted by using the fourth conversion relationship matrix, so as to obtain the three-dimensional color coordinates of the three-dimensional object in the marker measurement coordinate system at the first time.

The first rigid body coordinate system is a coordinate system based on the first rigid body, and in the first rigid body coordinate system, the three-dimensional coordinates of each component in the first rigid body are a constant value.

In this step, in the case where the fourth conversion relationship matrix $[K_{Mo1M}, T_{Mo1M}]$ at the first time is known, the three-dimensional coordinates $X_{M,1\sim P}$ of the P pixel points of the three-dimensional object in the marker measurement coordinate system at the first time may be obtained by means of conversion on the basis of the three-dimensional coordinates $X_{Mo1,1\sim P}$ of the P pixels among the three-dimensional color coordinates of the three-dimensional object in the first rigid body coordinate system according to formula (3):

$$X_{M,1\sim P}=X_{Mo1,1\sim P}*K_{Mo1M}+T_{Mo1M} \quad (3)$$

where $X_{M,1\sim P}=[x_{M,1}{}^T, \ldots, x_{M,i}{}^T, \ldots, x_{M,P}{}^T]$ and $X_{Mo1,1\sim P}=[x_{Mo1,1}{}^T, \ldots, x_{Mo1,i}{}^T, \ldots, x_{Mo1,P}{}^T]$.

In formula (3), $X_{M,1\sim P}$ represents a total coordinate matrix of the P pixel points in the marker measurement coordinate system at the first time, $X_{Mo1,1\sim p}$ represents a total coordinate matrix of the P pixel points in the first rigid body coordinate system, $x_{M,i}=(x_{Mi}, y_{Mi}, z_{Mi})$ represents three-dimensional coordinates of the ith pixel point among the P pixel points in the marker measurement coordinate system at the first time, and $x_{Mo1,i}=(x_{Mo1i}, y_{Mo1i}, z_{Mo1i})$ represents three-dimensional coordinates of the ith pixel point among the P pixel points in the first rigid body coordinate system.

The three-dimensional color coordinates of the three-dimensional object in the marker measurement coordinate system at the first time may be determined by combining the three-dimensional coordinates $X_{M,1\sim P}$ of the P pixel points of the three-dimensional object in the marker measurement coordinate system and the pixel values of the P pixel points in the two-dimensional color image of the three-dimensional object at the first time.

In step S230, according to a pre-stored second conversion relationship parameter between the marker measurement coordinate system and the infrared camera coordinate system, the three-dimensional color coordinates of the three-dimensional object in the marker measurement coordinate system at the first time are converted, so as to obtain three-dimensional color coordinates of the three-dimensional object in the infrared camera coordinate system at the first time.

Before step S230, the computer device pre-calibrates and stores the second conversion relationship parameter between the marker measurement coordinate system and the infrared camera coordinate system, wherein the second conversion relationship parameter may be a second conversion relationship matrix between the marker measurement coordinate system and the infrared camera coordinate system.

Exemplarily, in this step, in the case where the second conversion relationship matrix $[K_{Mi}, T_{Mi}]$ is known, the corresponding three-dimensional coordinates $X_{1,1\sim P}$ of the P pixel points of the two-dimensional color image in the infrared camera coordinate system at the first time may be obtained by means of conversion on the basis of the obtained three-dimensional coordinates $X_{M,1\sim p}$ of the P pixel points of the two-dimensional color image in the marker measurement coordinate system at the first time according to formula (4):

$$X_{I,1-P} = X_{M,1-P} * K_{MI} T_{MI} \qquad (4)$$

where $X_{I,1\sim P}=[X_{I,1}^T, \ldots, X_{I,i}^T, \ldots, X_{I,P}^T]$, and $X_{M,1\sim P}[x_{M,1}^T, \ldots, x_{M,i}^T, \ldots, x_{M,P}^T]$. $\Sigma_i^N(x_{Li}, y_{Li}, z_{Li})^T = \Sigma_i^N(x_{Mi}, y_{Mi}, z_{Mi})^T * K_{Lmi} + T_{LMi}$ In formula (4), $X_{I,1\sim p}$ represents a total coordinate matrix of the P pixel points in the infrared camera coordinate system at the first time, $X_{M,1\sim P}$ represents a total coordinate matrix of the P pixel points in the marker measurement coordinate system at the first time, P being the total number of pixel points of the two-dimensional color image corresponding to the three-dimensional color coordinates, $x_{I,i}= (x_{Ii}, y_{Ii}, z_{Ii})$ represents three-dimensional coordinates of the ith pixel point among the P pixel points in the infrared camera coordinate system at the first time, and $X_{M,i}=(x_{Mi}, y_{Mi}, z_{Mi})$ represents three-dimensional coordinates of the ith pixel point among the P pixel points in the marker measurement coordinate system at the first time.

Then, the three-dimensional color coordinates of the three-dimensional object in the infrared camera coordinate system at the first time may be determined by combining the three-dimensional coordinates $X_{I,1\sim P}$ of the P pixel points of the two-dimensional color image in the infrared camera coordinate system and the pixel values of the P pixel points at the first time.

In step S240, a three-dimensional point cloud image of the three-dimensional object in the infrared camera coordinate system at the first time is generated by combining the three-dimensional shape coordinates of the three-dimensional object in the infrared camera coordinate system at the first time and the three-dimensional color coordinates of the three-dimensional object in the infrared camera coordinate system at the first time.

In this step, the computer device may correspondingly map, according to a predetermined mapping relationship algorithm, each pixel value in the two-dimensional color image corresponding to the three-dimensional color coordinates at the first time to each point in a point cloud composed of points distributed at a predetermined density on the surface of the three-dimensional object corresponding to the three-dimensional shape coordinates at the first time, so as to generate the three-dimensional point cloud image capable of representing the color feature and the shape feature of the three-dimensional object at the first time.

In the described method for generating a three-dimensional point cloud image, the computer device pre-calibrates and pre-stores the first conversion relationship parameter between the three-dimensional marker coordinates of the marker set and the three-dimensional color coordinates of the three-dimensional object, and the second conversion relationship parameter between the marker measurement coordinate system and the infrared camera coordinate system. During real-time tracking of the three-dimensional object, it only needs to use the infrared camera to detect the three-dimensional shape coordinates of the three-dimensional object in the infrared camera coordinate system, and in the case where the three-dimensional object and the marker set form the first rigid body, the marker measurement device is used to detect the three-dimensional marker coordinates of the marker set in the marker measurement coordinate system at the same time. Then, by means of the pre-stored first conversion relationship parameter and second conversion relationship parameter, the three-dimensional coordinates of the three-dimensional object in the infrared camera coordinate system are obtained by means of conversion on the basis of the three-dimensional marker coordinates of the marker set in the marker measurement coordinate system. Thus, the three-dimensional point cloud image of the three-dimensional object in the infrared camera coordinate system can be generated by combining the three-dimensional shape coordinates of the three-dimensional object in the infrared camera coordinate system and the three-dimensional color coordinates of the three-dimensional object in the infrared camera coordinate system.

In the described method for generating a three-dimensional point cloud image of the present disclosure, during tracking of a three-dimensional object, a two-dimensional color image of the three-dimensional object does not need to be obtained, and detection of three-dimensional coordinates by an infrared camera and a marker will not be blocked by motion or other objects. Therefore, even if the three-dimensional object is blocked, a complete three-dimensional point cloud image of the three-dimensional object can also be reconstructed, without being limited by an acquisition viewing angle distance range of a color camera. Thus, the limitation to the motion range of a three-dimensional object during the tracking and reconstruction of a three-dimensional point cloud image is reduced, and the flexibility of detection and three-dimensional reconstruction of a moving three-dimensional object is effectively improved.

In the actual operation stage, steps S210 to S240 of the described acquisition and reconstruction stage may be performed at any specified timing (for example, performing once every given time step, e.g. performing once every second or minute), so as to implement real-time reconstruction and update of a three-dimensional point cloud image of a given three-dimensional object, and thus to dynamically track the three-dimensional point cloud image of the three-dimensional object.

Figure 3:
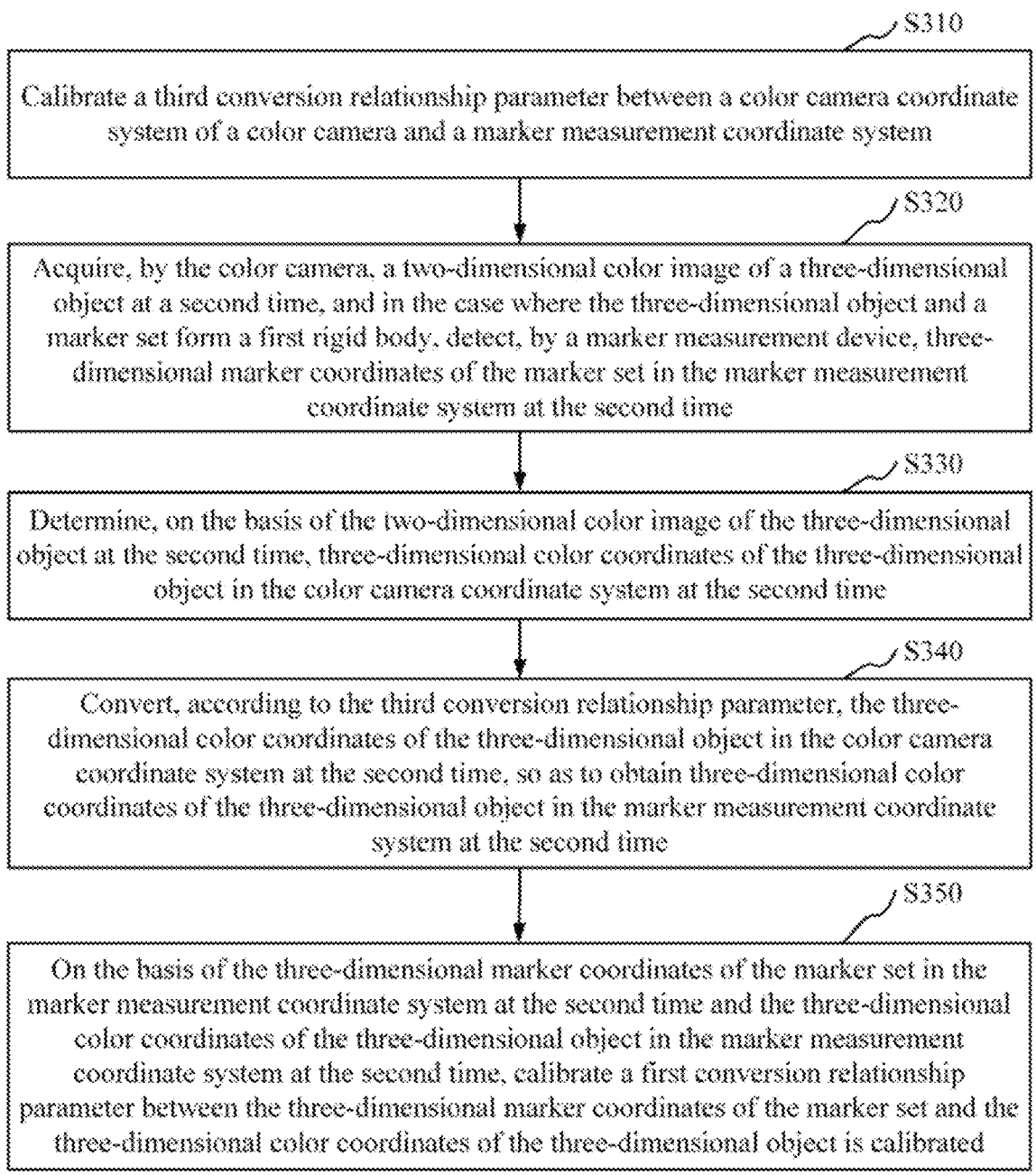
FIG. 3 is a schematic flowchart of steps of calibrating a first conversion relationship parameter according to an embodiment.

In some embodiments, in the pre-calibration stage, the method for generating a three-dimensional point cloud image of the present disclosure further comprises a step of calibrating a first conversion relationship parameter. As shown in FIG. 3, the step of calibrating the first conversion relationship parameter comprises the following steps S310 to S350.

In S310, a third conversion relationship parameter between a color camera coordinate system of a color camera and a marker measurement coordinate system is calibrated.

The third conversion relationship parameter may be a third conversion relationship matrix $[K_{RM}, T_{RM}]$ between the color camera coordinate system and the marker measurement coordinate system.

In S320, a two-dimensional color image of a three-dimensional object at a second time is acquired by using the color camera, and in the case where the three-dimensional object and a marker set form a first rigid body, three-dimensional marker coordinates of the marker set in the marker measurement coordinate system at the second time are detected detecting by using a marker measurement device.

The first rigid body in this step is the same as the first rigid body in step S210, that is, the components comprised in the first rigid body in this step and the relative position relationship between the components are the same as the components comprised in the first rigid body in step S210 and the relative position relationship between the components.

In this step, a computer device controls the color camera to detect the two-dimensional color image of the three-dimensional object at the second time, wherein the two-dimensional color image comprises pixel values (e.g. RGB values) of P pixel points arranged at a fixed relative position. At the same time, the computer device controls the marker measurement device to detect the three-dimensional marker coordinates of the marker set in the marker measurement coordinate system at the second time, wherein the three-dimensional marker coordinates comprise N three-dimensional coordinate values corresponding to N markers in the marker measurement coordinate system.

Exemplarily, the color camera may be implemented by an RGBD camera, and the RGBD camera may comprise an IR camera and an RGB camera. The IR camera may obtain, by means of disparity map calculation, three-dimensional coordinates of a point cloud on the surface of the three-dimensional object to be measured, wherein the three-dimensional coordinates is generally a reference coordinate system based on the IR camera. The RGB camera is a camera for detecting RGB color features of the three-dimensional object. If a three-dimensional coordinate system based on the RGB camera is required to be obtained, it needs to convert the reference coordinate system of the IR camera into an RGB camera coordinate system by means of coordinate conversion by using a conversion relationship parameter built in the RGBD. The conversion relationship parameter is an inherent parameter of the RGBD, and once the mold opening production of the RGBD camera is completed, the conversion relationship parameter is fixed. This fixed parameter may generally be obtained through an API of the RGBD camera.

The computer device may control the color camera built in the RGBD camera to acquire an original RGB image. The original RGB image may be directly used as the two-dimensional color image; alternatively, feature pixel points of a given density may also be extracted on the basis of the original image by means of a landmark detection algorithm so as to form the two-dimensional color image. The density of the feature pixel point of the given density may be the same as the density of a point cloud composed of points distributed at a pre-determined density on the surface of the three-dimensional object in three-dimensional shape coordinates. The two-dimensional color image may comprise P pixel points and corresponding two-dimensional coordinates of the P pixel points representing a fixed relative position between the P pixel points.

Exemplarily, each marker in the marker set can reflect/emit an infrared ray. The marker measurement device calculates a disparity map by detecting, through the IR camera comprised therein, the infrared ray reflected/emitted by the marker, so as to determine position coordinates of the marker. The marker measurement device may also be implemented by the RGBD camera, for example.

In S330, on the basis of the two-dimensional color image of the three-dimensional object at the second time, three-dimensional color coordinates of the three-dimensional object in the color camera coordinate system at the second time is determined.

In this step, the color camera may be implemented by the RGBD camera, for example. The three-dimensional color coordinates of the three-dimensional object in the color camera coordinate system may be calculated by means of a built-in algorithm and on the basis of the two-dimensional color image and a three-dimensional conversion relationship parameter inherent to the color camera.

In S340, the three-dimensional color coordinates of the three-dimensional object in the color camera coordinate system at the second time are converted according to the third conversion relationship parameter, so as to obtain three-dimensional color coordinates of the three-dimensional object in the marker measurement coordinate system at the second time.

The computer device pre-stores the third conversion relationship matrix $[K_{RM}, T_{RM}]$, so that in this step, in the case where the third conversion relationship matrix $[K_{RM}, T_{RM}]$ is known, the corresponding three-dimensional coordinates $X_{M,1\sim P}$ of the P pixel points of the two-dimensional image in the marker measurement coordinate system at the second time may be obtained by means of conversion on the basis of the obtained three-dimensional coordinates $X_{R,1\sim P}$ of the P pixel points of the two-dimensional color image in the color camera coordinate system at the second time according to formula (5):

$$K_{M,1\sim P}=X_{R,1\sim P}*K_{RM}+T_{RM} \quad (5)$$

where $X_{M,1\sim P}=[x_{M,1}^T, \ldots, x_{M,i}^T, \ldots, x_{M,P}^T]$, $X_{R,1\sim P}=[X_{R,1}^T, \ldots, x_{R,i}^T, \ldots, x_{R,P}^T] \cdot \Sigma_i^N (x_{Li},y_{Li},Z_{Li})^T = \Sigma_i^N (x_{Mi},y_{Mi},z_{Mi})^T * K_{LMi}+T_{LMi}$ In formula (5), $X_{M,1\sim P}$ represents a total coordinate matrix of the P pixel points in the marker measurement coordinate system at the second time, $X_{R,1\sim P}$ represents a total coordinate matrix of the P pixel points in the color camera coordinate system at the second time, P being the total number of pixel points of the two-dimensional color image corresponding to the three-dimensional color coordinates, $x_{M,i}=(x_{Mi},y_{Mi},z_{Mi})$ represents three-dimensional coordinates of the ith pixel point among the P pixel points in the marker measurement coordinate system at the second time, and $x_{R,i}=(x_{Ri},y_{Ri},z_{rti})$ represents three-dimensional coordinates of the ith pixel point among the P pixel points in the color camera coordinate system at the second time.

The three-dimensional color coordinates of the three-dimensional object in the marker measurement coordinate system at the second time may be determined by combining the three-dimensional coordinates $X_{M,1\sim P}$ of the P pixel points of the three-dimensional object in the marker measurement coordinate system and the pixel values of the P pixel points at the second time.

In S350, on the basis of the three-dimensional marker coordinates of the marker set in the marker measurement coordinate system at the second time and the three-dimensional color coordinates of the three-dimensional object in the marker measurement coordinate system at the second time, a first conversion relationship parameter between the three-dimensional marker coordinates of the marker set and the three-dimensional color coordinates of the three-dimensional object is calibrated.

In some embodiments, the marker set comprises N markers, and the first conversion relationship parameter in step S350 comprises a first conversion relationship matrix between three-dimensional marker coordinates of the N markers comprised in the marker set and three-dimensional coordinates of N pixel points at given positions in the two-dimensional color image of the three-dimensional object, and the pixel value of each pixel point in the two-dimensional color image. Step S350 comprises:

in step S351, on the basis the three-dimensional color coordinates of the three-dimensional object in the marker measurement coordinate system at the second time, the three-dimensional coordinates of the N pixel points at given positions in the two-dimensional color image of the three-dimensional object and the pixel value of each pixel point in the two-dimensional color image at the second time are obtained.

In step S352, on the basis of the three-dimensional marker coordinates of the N markers comprised in the marker set in the marker measurement coordinate system at the second time and the three-dimensional coordinates of the N pixel points at the given positions in the two-dimensional color image of the three-dimensional object at the second time, the first conversion relationship parameter between the three-dimensional marker coordinates of the marker set and the three-dimensional color coordinates of the three-dimensional object is calibrated.

Exemplarily, in the present embodiments, since in the first rigid body, the N markers of the marker set are in one-to-one correspondence with the N pixel points at the given positions in the two-dimensional color image of the three-dimensional object to form a rigid body, the three-dimensional marker coordinates $X_{M,1\sim N}$ of the N markers comprised in the marker set at the second time and the three-dimensional coordinates $X_{L,i\sim N}$ of the N pixel points at the given positions in the two-dimensional color image of the three-dimensional object at the second time satisfy the following conversion relationship in the marker measurement coordinate system:

$$\Sigma_i^N (x_{Li}, y_{Li}, z_{Li})^T = \Sigma_i^N (x_{Mi}, y_{Mi}, z_{Mi})^T * K_{LMi} + T_{LMi} \quad (6)$$

where $X_{M,1\sim N} = [x_{M,1}^T, \ldots, x_{M,i}^T, \ldots, x_{M,N}^T]$, and $X_{L,1\sim N} = [x_{L,1}^T, \ldots, x_{L,i}^T, \ldots, x_{L,N}^T]$.

In formula (6), $X_{M,1\sim N}$ represents a total coordinate matrix of the N markers in the marker measurement coordinate system at the second time, $X_{L,1\sim N}$ represents a total coordinate matrix of the N pixel points in the marker measurement coordinate system at the second time, $x_{M,i} = (x_{Mi}, y_{Mi}, z_{Mi})$ represents three-dimensional coordinates of the ith marker among the N markers in the marker measurement coordinate system at the second time, and $x_{L,i} = (x_{Li}, y_{Li}, z_{Li})$ represents three-dimensional coordinates of the ith pixel point among the N pixel points in the marker measurement coordinate system at the second time.

The first conversion relationship matrix $[K_{LM}, T_{LM}]$ may be obtained by solving formula (6). The computer device stores the first conversion relationship matrix $[K_{LM}, T_{LM}]$ and the pixel value of each pixel point in the two-dimensional color image for use in the actual operation stage.

In some embodiments, the first conversion relationship parameter in step S350 comprises three-dimensional color coordinates of the three-dimensional object in a first rigid body coordinate system and three-dimensional marker coordinates of the marker set in the first rigid body coordinate system. Step S350 comprises:

In step S353, a first rigid body coordinate system is established, and three-dimensional marker coordinates of the marker set in the first rigid body coordinate system are obtained.

Exemplarily, in the case where the three-dimensional marker coordinates of each marker in the marker set in the marker measurement coordinate system have been measured, the relative position relationship between various markers is determined. Therefore, the first rigid body coordinate system (Mo1 coordinate system) may be constructed on the basis of the N markers of the first rigid body. For example, a coordinate axis x may be constructed according to two markers (O1, A1), then the marker O1 is taken as the origin of a coordinate system, and a coordinate axis y is constructed by the marker O1 and another marker A2 perpendicular to the coordinate axis x, and a coordinate axis z is established according to an x-O1-y plane, so as to form a first rigid body coordinate system. Thus, three-dimensional coordinates of each marker in the marker set in the first rigid body coordinate system may be determined accordingly.

In step S354, according to the three-dimensional marker coordinates of the marker set in the marker measurement coordinate system and the three-dimensional marker coordinates of the marker set in the first rigid body coordinate system at the second time, a fifth conversion relationship matrix between a marker set measurement coordinate system and the first rigid body coordinate system at the second time is calibrated.

Exemplarily, the three-dimensional marker coordinates $X_{Mo1,1\sim N}$ of the N markers comprised in the marker set in the first rigid body coordinate system and the three-dimensional marker coordinates $X_{M,1\sim N}$ of the N markers comprised in the marker set in the marker measurement coordinate system at the second time satisfy the following conversion relationship:

$$X_{M,1\sim N} = X_{Mo1,1\sim N} * K_{Mo1M} + T_{Mo1M} \quad (7)$$

where $X_{M,1\sim N} = [x_{M,1}^T, \ldots, x_{M,i}^T, \ldots, x_{M,N}^T]$, and $X_{Mo1,1\sim N} = [x_{Mo1,1}^T, \ldots, x_{Mo1,i}^T, \ldots, x_{Mo1,N}^T]$.

In (7), $X_{M,1\sim N}$ represents a total coordinate matrix of the N markers in the marker measurement coordinate system at the second time, $X_{Mo1,1\sim N}$ represents a total coordinate matrix of the N markers in the first rigid body coordinate system, $x_{M,i} = (x_{Mi}, y_{Mi}, z_{Mi})$ represents three-dimensional coordinates of the ith marker among the N markers in the marker measurement coordinate system at the second time, and $x_{Mo1,i} = (x_{Mo1i}, y_{Mo1i}, z_{Mo1i})$ represents three-dimensional coordinates of the ith marker among the N markers in the first rigid body coordinate system.

The fifth conversion relationship matrix $[K_{Mo1M}, T_{Mo1M}]$ at the second time may be obtained by solving formula (7).

In step S355, the three-dimensional color coordinates of the three-dimensional object in the marker measurement coordinate system at the second time is converted by using the fifth conversion relationship matrix, so as to obtain the three-dimensional color coordinates of the three-dimensional object in the first rigid body coordinate system at the second time.

In this step, in the case where the fifth conversion relationship matrix $[K_{Mo1M}, T_{Mo1M}]$ at the second time is known, the three-dimensional coordinates $X_{Mo1,1\sim P}$ of the P pixel points in the three-dimensional color coordinates of the three-dimensional object in the first rigid body coordinate system at the second time may be obtained by means of conversion on the basis of the three-dimensional coordinates $X_{M,1\sim P}$ of the P pixel points in the three-dimensional color coordinates of the three-dimensional object in the marker measurement coordinate system at the second time according to formula (8):

$$X_{M,1\sim P}=X_{Mo1,1\sim P}*K_{Mo1M}+T_{Mo1M} \qquad (8)$$

where $X_{M,1\sim P}=[x_{M,1}^T, \ldots, x_{M,i}^T, \ldots, x_{M,P}^T]$, and $X_{Mo1,1\sim P}=[x_{Mo1,1}^T, \ldots, x_{Mo1,i}^T, \ldots, x_{Mo1,P}^T]$.

In formula (8), $X_{M,1\sim N}$ represents a total coordinate matrix of the P pixel points in the marker measurement coordinate system at the second time, $X_{Mo1,1\sim P}$ represents a total coordinate matrix of the P pixel points in the first rigid body coordinate system, $x_{M,i}=(x_{Mi},y_{Mi},z_{Mi})$ represents three-dimensional coordinates of the ith pixel point among the P pixel points in the marker measurement coordinate system at the second time, and $x_{Mo1,i}=(x_{Mo1i},y_{Mo1i},z_{Mo1i})$ represents three-dimensional coordinates of the ith pixel point among the P pixel points in the first rigid body coordinate system.

The three-dimensional color coordinates of the three-dimensional object in the first rigid body coordinate system at the second time may be determined by combining the three-dimensional coordinates $X_{Mo1,1\sim P}$ of each pixel point in the three-dimensional color coordinates of the three-dimensional object in the first rigid body coordinate system and the pixel value of each pixel point in the two-dimensional color image in the three-dimensional color coordinates of the three-dimensional object at the second time.

In step S356, the three-dimensional color coordinates of the three-dimensional object in the first rigid body coordinate system and the three-dimensional marker coordinates of the marker set in the first rigid body coordinate system are used as the first conversion relationship parameter between the three-dimensional marker coordinates of the marker set and the three-dimensional color coordinates of the three-dimensional object.

In this step, the three-dimensional marker coordinates $X_{Mo1,1\sim N}$ of the N markers in the first rigid body coordinate system, the three-dimensional coordinates $X_{Mo1,1\sim P}$ of each pixel point in the three-dimensional coordinates of the three-dimensional object in the first rigid body coordinate system, and the pixel value of each pixel point in the two-dimensional color image in the three-dimensional color coordinates of the three-dimensional object which are determined in the descried steps are jointly used as the first conversion relationship parameter, and the computer device stores the first conversion relationship parameter for use in the actual operation stage.

Figure 4:
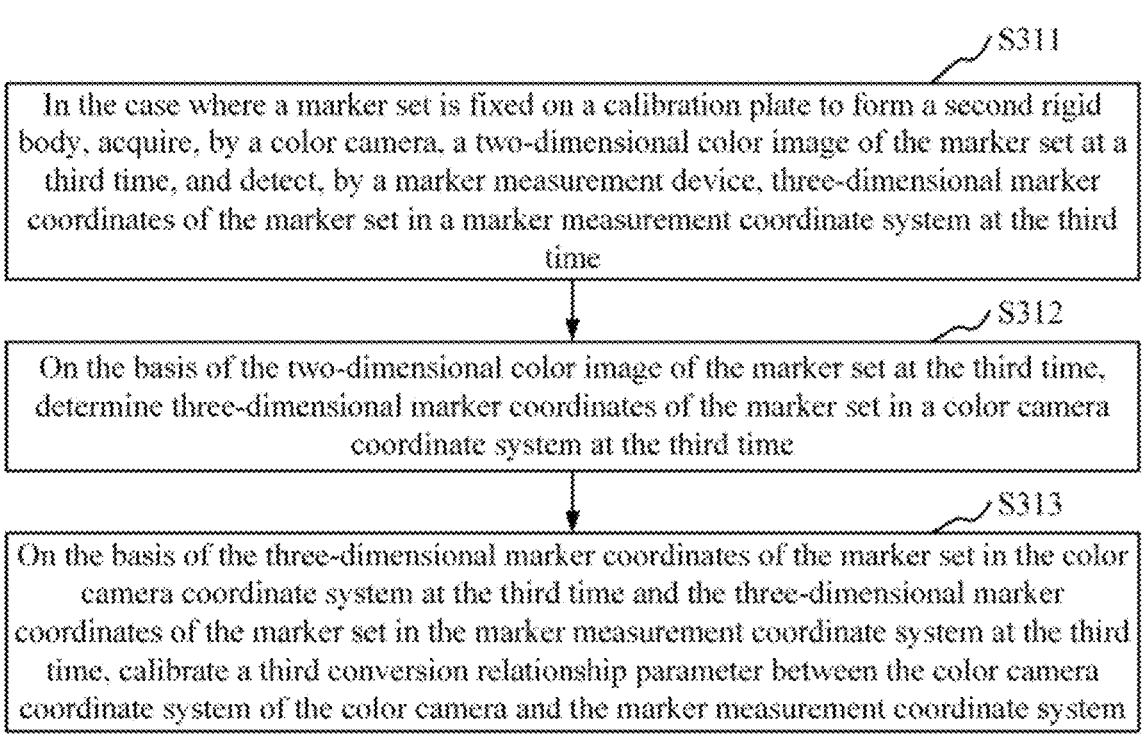
FIG. 4 is a schematic flowchart of steps of calibrating a third conversion relationship parameter according to an embodiment.

In some embodiments, as shown in FIG. 4, the step of calibrating a third conversion relationship parameter between a color camera coordinate system of a color camera and a marker measurement coordinate system in step S310 comprises the following steps S311 to S313.

In S311, in the case where a marker set is fixed on a calibration plate to form a second rigid body, a two-dimensional color image of a marker set at a third time is acquiring by using a color camera, and three-dimensional marker coordinates of the marker set in a marker measurement coordinate system at the third time is detected by using a marker measurement device.

In some embodiments, the second rigid body is composed of a second sub-rigid body and the calibration plate, and the second sub-rigid body is formed by arranging the plurality of markers comprised in the marker set in a non-collinear manner on the calibration plate.

The calibration plate is a rigid object used for fixing markers so as to form a rigid body. Exemplarily, the calibration plate may be a checkerboard calibration plate having a black-white square pattern (for example, a pattern formed by arranging black and white checkerboard squares of the same size in a matrix in a black-and-white manner) on one side thereof. Accordingly, each marker in the marker set may be fixed at the center of the corresponding checkerboard square.

The marker set fixed on the calibration plate may have Q markers. The value of Q is determined according to actual needs, and preferably, Q is greater than or equal to 4.

Taking Q being 4 as an example, exemplarily, four markers of the marker set may be fixed at four corners of the calibration plate, i.e. the centers of the four outermost checkerboard squares of the checkerboard calibration plate.

In this step, the computer device may acquire the two-dimensional color image of the marker set at the third time and the three-dimensional marker coordinates $X_{M,1\sim Q}$ of the Q markers in the marker measurement coordinate system by using the color camera and the marker measurement device.

In S312, on the basis of the two-dimensional color image of the marker set at the third time, three-dimensional marker coordinates of the marker set in a color camera coordinate system at the third time is determined.

In this step, the color camera may be implemented by an RGBD camera, for example. The three-dimensional color coordinates of the two-dimensional color image in the color camera coordinate system may be calculated by means of a built-in algorithm and on the basis of the two-dimensional color image and a three-dimensional conversion relationship parameter inherent to the color camera, and then three-dimensional marker coordinates of each marker in the marker set in the color camera coordinate system may be determined by identifying and extracting markers in the two-dimensional color image.

When the calibration plate is the described checkerboard calibration plate, and the Q markers are fixed at the centers of the corresponding Q checkered squares, the computer device may firstly detect two-dimensional image coordinates of each checkerboard corner in the calibration plate according to the two-dimensional color image, and then obtain three-dimensional coordinates of the checkerboard corners in the color camera coordinate system according to the two-dimensional image coordinates of the checkerboard corners and the three-dimensional conversion relationship parameter inherent to the color camera. Since the three-dimensional coordinates of the checkerboard corners are known, the three-dimensional coordinates of the centers of the Q checkerboard squares may be obtained by identifying and extracting the markers in the two-dimensional color image, i.e. the three-dimensional coordinates $X_{R,1\sim Q}$ of the Q markers in the color camera coordinate system.

In step S313, on the basis of the three-dimensional marker coordinates of the marker set in the color camera coordinate system at the third time and the three-dimensional marker coordinates of the marker set in the marker measurement coordinate system at the third time, a third conversion relationship parameter between the color camera coordinate system of the color camera and the marker measurement coordinate system is calibrated.

The three-dimensional marker coordinates $X_{M,1\sim Q}$ of the Q markers of the marker set in the marker measurement coordinate system at the third time and the three-dimensional coordinates $X_{R,1\sim Q}$ of the Q markers in the color camera coordinate system at the third time satisfy the following conversion relationship:

$$X_{M,1\sim Q}=X_{R,1\sim Q}*K_{RM}+T_{RM} \qquad (9)$$

where $X_{M,1\sim Q}=[x_{M,1}{}^T, \ldots, x_{M,i}{}^T, \ldots, x_{M,Q}{}^T]$, $X_{R,1\sim Q}=[x_{R,1}{}^T, \ldots, x_{R,i}{}^T, \ldots, x_{R,Q}{}^T] \cdot \Sigma_i{}^N(x_{Li},y_{Li},z_{Mi})^T = \Sigma_i{}^N(x_{Mi},y_{Mi},z_{Mi})^{T*}K_{LMi}+T_{LMi}\Sigma_i{}^N(x_{Li},y_{Li},Z_{Li})^T = \Sigma_i{}^N(x_{Mi},y_{Mi},z_{Mi})^{T*}K_{Lmi}+T_{LMi}$ In formula (9), $X_{M,1\sim Q}$ represents a total coordinate matrix of the Q markers in the marker measurement coordinate system at the third time, $X_{R,1\sim Q}$ represents a total coordinate matrix of the Q markers in the color camera coordinate system at the third time, $x_{M,i}=(x_{Mi},y_{Mi},z_{Mi})$ represents three-dimensional coordinates of the ith marker among the Q markers in the marker measurement coordinate system at the third time, and $x_{R,i}=(x_{Ri},y_{Ri},z_{Ri})$ represents three-dimensional coordinates of the ith marker among the Q markers in the color camera coordinate system at the third time.

Thus, the third conversion relationship matrix $[K_{RM}, T_{RM}]$ may be solved according to formula (9), and the computer device may store the third conversion relationship matrix $[K_{RM}, T_{RM}]$ for use in the actual operation stage.

Figure 5:
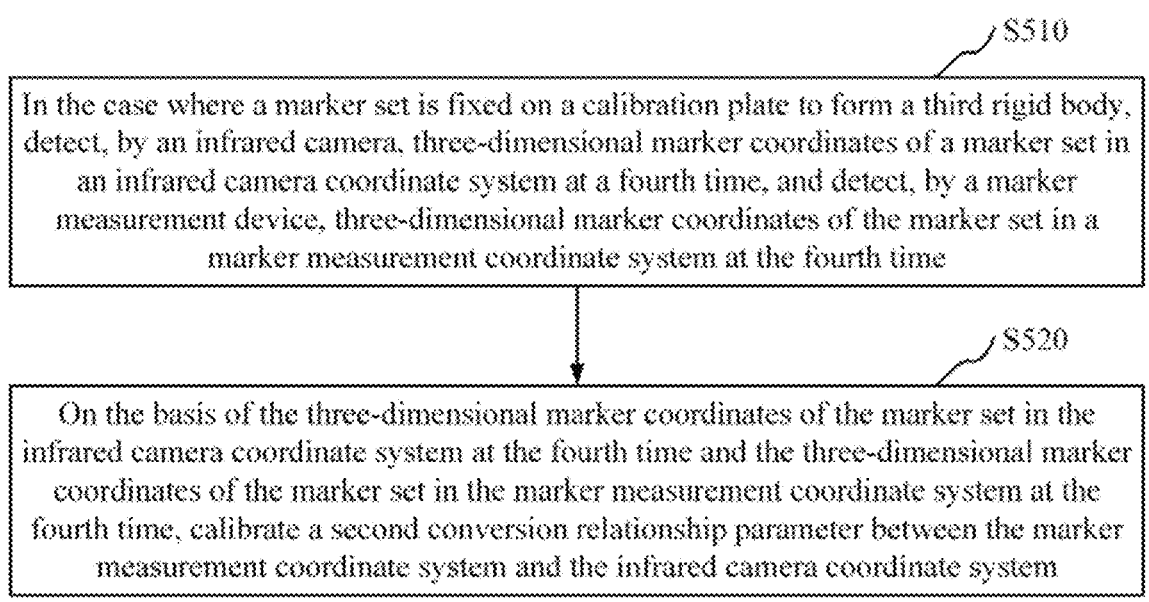
FIG. 5 is a schematic flowchart of steps of calibrating a second conversion relationship parameter according to an embodiment.

In some embodiments, in the pre-calibration stage, the method for generating a three-dimensional point cloud image of the present disclosure further comprises a step of calibrating a second conversion relationship parameter. As shown in FIG. 5, the calibration of the second conversion relationship parameter comprises:

in S510, in the case where a marker set is fixed on a calibration plate to form a third rigid body, three-dimensional marker coordinates of a marker set in an infrared camera coordinate system at a fourth time are detected by using an infrared camera, and three-dimensional marker coordinates of the marker set in a marker measurement coordinate system at the fourth time are detected by using a marker measurement device.

In some embodiments, the third rigid body is composed of a third sub-rigid body and the calibration plate, and the third sub-rigid body is formed by arranging the plurality of markers comprised in the marker set in a non-collinear manner on the calibration plate.

In the third rigid body in this step, the marker set fixed on the calibration plate may have S markers, and preferably, S is greater than or equal to 4. For details of specific formation of the third rigid body, reference may be made to the described details of specific formation the second rigid body, and details are not repeatedly described herein.

In this step, the computer device may acquire the three-dimensional marker coordinates $X_{I,1\sim S}$ of the S markers in the marker set in the infrared camera coordinate system and the three-dimensional marker coordinates $X_{M,1\sim S}$ of the S markers in the marker measurement coordinate system at the fourth time by using the infrared camera and the marker measurement device.

In S520, on the basis of the three-dimensional marker coordinates of the marker set in the infrared camera coordinate system at the fourth time and the three-dimensional marker coordinates of the marker set in the marker measurement coordinate system at the fourth time, a second conversion relationship parameter between the marker measurement coordinate system and the infrared camera coordinate system is calibrated.

The second conversion relationship parameter may be a second conversion relationship matrix $[K_{MI}, T_{MI}]$ between the three-dimensional marker coordinates and the three-dimensional color coordinates of the three-dimensional object.

The three-dimensional marker coordinates $X_{I,1\sim S}$ of the S markers in the marker set in the infrared camera coordinate system at the fourth time and the three-dimensional coordinates $X_{M,1\sim S}$ of the S markers in the marker measurement coordinate system at the fourth time satisfy the following conversion relationship:

$$X_{I,1\sim S}=X_{M,1\sim S}*K_{MI}+T_{MI} \quad (10)$$

where $X_{I,1\sim S}=[x_{I,1}{}^T, \ldots, x_{I,i}{}^T, \ldots, x_{I,S}{}^T]$, and $X_{M,1\sim S}=[x_{M,1}{}^T, \ldots, x_{M,i}{}^T, \ldots, x_{M,S}{}^T] \cdot \Sigma_i{}^N(x_{Li},y_{Li},z_{Li})^T = \Sigma_i{}^N(x_{Mi},y_{Mi},z_{Mi})^{T*}K_{LMi}+T_{LMi}\Sigma_i{}^N(x_{Li},y_{Li},z_{Li})^T = \Sigma_i{}^N(x_{Mi},y_{Mi},z_{Mi})^{T*}K_{LMi}+T_{LMi}$ In formula (10), $X_{I,1\sim S}$ represents a total coordinate matrix of the S markers in the infrared camera coordinate system at the fourth time, $X_{M,1\sim S}$ represents a total coordinate matrix of the S markers in the marker measurement coordinate system at the fourth time, $x_{I,i}=(x_{Ii},y_{Ii},z_{Ii})$ represents three-dimensional coordinates of the ith marker among the S markers in the infrared camera coordinate system at the fourth time, and $x_{M,i}=(x_{Mi},y_{Mi},z_{Mi})$ represents three-dimensional coordinates of the ith marker among the S markers in the marker measurement coordinate system at the fourth time.

Thus, the second conversion relationship matrix $[K_{MI}, T_{MI}]$ may be solved according to formula (10), and the computer device may store the second conversion relationship matrix $[K_{MI}, T_{MI}]$ for use in the actual operation stage.

It should be understood that, although the steps in the flowcharts of FIGS. 2 to 5 are displayed in order as indicated by the arrows, the steps are not necessarily executed in order as indicated by the arrows. Unless explicitly stated herein, the execution order of the steps are not limited strictly, and the steps may be executed in other orders. Furthermore, at least a part of the steps in FIGS. 2 to 5 may comprise a plurality of sub-steps or a plurality of stages. These sub-steps or stages are not necessarily executed at the same time, but may be executed at different times; and these sub-steps or stages are also not necessarily executed in order, but may be executed in turns or alternately with other steps or at least a part of the sub-steps or stages of other steps.

Figure 6:
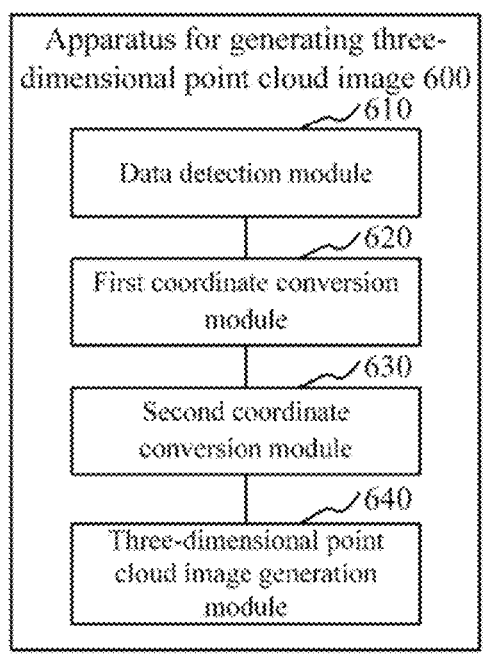
FIG. 6 is a structural block diagram of an apparatus for generating a three-dimensional point cloud image according to an embodiment.

In some embodiments, as shown in FIG. 6, an apparatus 600 for generating a three-dimensional point cloud image is provided, comprising a data detection module 610, a first coordinate conversion module 620, a second coordinate conversion module 630 and a three-dimensional point cloud image generation module 640, wherein:

the data detection module 610 is configured to detect, by an infrared camera, three-dimensional shape coordinates of a three-dimensional object in an infrared camera coordinate system at a first time, and in the case where the three-dimensional object and a marker set form a first rigid body, detect, by a marker measurement device, three-dimensional marker coordinates of the marker set in a marker measurement coordinate system at the first time, the marker set comprising a plurality of markers;

the first coordinate conversion module 620 is configured to determine, according to a pre-stored first conversion relationship parameter between the three-dimensional marker coordinates of the marker set and three-dimensional color coordinates of the three-dimensional object, and the three-dimensional marker coordinates of the marker set in the marker measurement coordinate system at the first time, three-dimensional color coordinates of the three-dimensional object in the marker measurement coordinate system at the first time;

the second coordinate conversion module 630 is configured to convert, according to a pre-stored second conversion relationship parameter between the marker measurement coordinate system and the infrared camera coordinate system, the three-dimensional color coordinates of the three-dimensional object in the marker measurement coordinate system at the first time, so as to obtain three-dimensional color coordinates of the three-dimensional object in the infrared camera coordinate system at the first time; and the three-dimensional point cloud image generation module 640 is configured to generate a three-dimensional point cloud image of the three-dimensional object in the infrared camera coordinate system at the first time by combining the three-dimensional shape coordinates of the three-dimensional object in the infrared camera coordinate system at the first time and the three-dimensional color coordinates of the three-dimensional object in the infrared camera coordinate system at the first time.

For the specific limitation of the apparatus for generating a three-dimensional point cloud image, reference may be made to the limitation of the method for generating a three-dimensional point cloud image in the foregoing, and details are not repeatedly described herein. All or some of the modules in the described apparatus for generating a three-dimensional point cloud image may be implemented by software, hardware, or a combination thereof. The described modules may be embedded in or independent of a processor in a computer device in the form of hardware, and may also be stored in a memory in the computer device in the form of software, so that the processor invokes and executes operations corresponding to the described modules.

Figure 7:
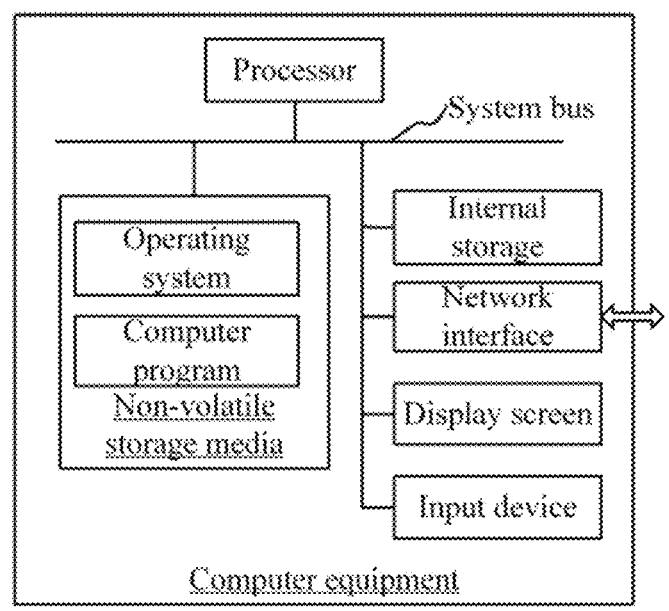
FIG. 7 is an internal structure diagram of a computer device according to an embodiment.

In some embodiments, a computer device is provided, and the internal structure diagram thereof may be shown in FIG. 7. The computer device comprises a processor, a memory, a network interface, a display screen and an input unit which are connected by a system bus. The processor of the computer device is configured to provide computing and control capabilities. The memory of the computer device comprises a non-transitory storage medium, and an internal memory. The non-transitory storage medium stores an operating system and a computer program. The internal memory provides an environment for the running of the operating system and the computer program in the non-transitory storage medium. The network interface of the computer device is configured to communicate with an external terminal via a network connection. The computer program is executed by the processor to implement a method for generating a three-dimensional point cloud image. The display screen of the computer device may be a liquid crystal display screen or an electronic ink display screen. The input unit of the computer device may be a touch layer covered on the display screen, may also be a button, a trackball or a touch control panel provided on the housing of the computer device, and may also be an external keyboard, touch control panel or mouse.

A person skilled in the art can understand that the structure shown in FIG. 7 is merely a block diagram of a partial structure related to the solution of the present disclosure, and does not limit the computer device to which the solution of the present disclosure is applied. A specific computer device may comprise more or fewer components than those shown in the figure, or combine some components, or have different component arrangements.

In some embodiments, a computer device is provided, comprising a memory and a processor, wherein the memory stores a computer program, and when the processor executes the computer program, the following steps are implemented:

detecting, by an infrared camera, three-dimensional shape coordinates of a three-dimensional object in an infrared camera coordinate system at a first time, and in the case where the three-dimensional object and a marker set form a first rigid body, detecting, by a marker measurement device, three-dimensional marker coordinates of the marker set in a marker measurement coordinate system at the first time, the marker set comprising a plurality of markers;

determining, according to a pre-stored first conversion relationship parameter between the three-dimensional marker coordinates of the marker set and three-dimensional color coordinates of the three-dimensional object, and the three-dimensional marker coordinates of the marker set in the marker measurement coordinate system at the first time, three-dimensional color coordinates of the three-dimensional object in the marker measurement coordinate system at the first time;

converting, according to a pre-stored second conversion relationship parameter between the marker measurement coordinate system and the infrared camera coordinate system, the three-dimensional color coordinates of the three-dimensional object in the marker measurement coordinate system at the first time, so as to obtain three-dimensional color coordinates of the three-dimensional object in the infrared camera coordinate system at the first time; and generating a three-dimensional point cloud image of the three-dimensional object in the infrared camera coordinate system at the first time by combining the three-dimensional shape coordinates of the three-dimensional object in the infrared camera coordinate system at the first time and the three-dimensional color coordinates of the three-dimensional object in the infrared camera coordinate system at the first time.

In some embodiments, when the processor executes the computer program, the steps of the method for generating a three-dimensional point cloud image according to any one of the described embodiments are further implemented.

In some embodiments, a computer-readable storage medium is provided, on which a computer program is stored, wherein the computer program, when executed by a processor, implements the following steps:

detecting, by an infrared camera, three-dimensional shape coordinates of a three-dimensional object in an infrared camera coordinate system at a first time, and in the case where the three-dimensional object and a marker set form a first rigid body, detecting, by a marker measurement device, three-dimensional marker coordinates of the marker set in a marker measurement coordinate system at the first time, the marker set comprising a plurality of markers;

determining, according to a pre-stored first conversion relationship parameter between the three-dimensional marker coordinates of the marker set and three-dimensional color coordinates of the three-dimensional object, and the three-dimensional marker coordinates of the marker set in the marker measurement coordinate system at the first time, three-dimensional color coordinates of the three-dimensional object in the marker measurement coordinate system at the first time;

converting, according to a pre-stored second conversion relationship parameter between the marker measurement coordinate system and the infrared camera coordinate system, the three-dimensional color coordinates of the three-dimensional object in the marker measurement coordinate system at the first time, so as to obtain three-dimensional color coordinates of the three-dimensional object in the infrared camera coordinate system at the first time; and generating a three-dimensional point cloud image of the three-dimensional object in the infrared camera coordinate system at the first time by combining the three-dimensional shape coordinates of the three-dimensional object in the infrared camera coordinate system at the first time and the three-dimensional color coordinates of the three-dimensional object in the infrared camera coordinate system at the first time.

In some embodiments, the computer program, when executed by the processor, further implements the steps of the method for generating a three-dimensional point cloud image according to any one of the described embodiments.

Those of ordinary skill in the art can understand that implementation of all or some of the flows in the method according to the described embodiments may be completed by a computer program instructing related hardware. The computer program may be stored in a non-transitory computer-readable storage medium, and the computer program, when executed, may comprise the flows of the embodiments of the described method. Any references to memory, storage, database or other media used in the embodiments provided in the present disclosure may include a non-transitory memory and/or a transitory memory. The non-transitory memory may include a read only memory (ROM), a programmable ROM (PROM), an electrically programmable ROM (EPROM), an electrically erasable programmable ROM (EEPROM), or a flash memory. The non-transitory memory may include a random access memory (RAM), or an external cache memory. By way of illustration but not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), Synchlink DRAM (SDRAM), Rambus direct RAM (RDRAM), Direct Rambus dynamic RAM (DRDRAM), and Rambus dynamic RAM (RDRAM).

The technical features of the described embodiments may be combined in arbitrary manners, and for brevity of description, all possible combinations of the technical features in the described embodiments are not fully described. However, as long as the combinations of these technical features are not contradictory, all these technical features should be considered to fall within the scope of the description.

The described embodiments are merely several embodiments of the present disclosure, and the description thereof is relatively specific and detailed, but this cannot be understood as a limitation to the scope of the disclosure. It should be noted that, those of ordinary skill in the art may make further modifications and improvements without departing from the spirit of the present disclosure, and these modifications and improvements shall also fall within the scope of the present disclosure. Therefore, the scope of protection of the present disclosure should be defined according to the claims.

What is claimed is:

1. A method for generating a three-dimensional point cloud image, comprising:
    detecting, by an infrared camera, three-dimensional shape coordinates of a three-dimensional object in an infrared camera coordinate system at a first time, and in the case where said three-dimensional object and a marker set form a first rigid body, detecting, by a marker measurement device, three-dimensional marker coordinates of said marker set in a marker measurement coordinate system at said first time, said marker set comprising a plurality of markers;
    determining, according to a pre-stored first conversion relationship parameter between the three-dimensional marker coordinates of said marker set and three-dimensional color coordinates of said three-dimensional object, and said three-dimensional marker coordinates of said marker set in said marker measurement coordinate system at said first time, three-dimensional color coordinates of said three-dimensional object in said marker measurement coordinate system at said first time;
    converting, according to a pre-stored second conversion relationship parameter between said marker measurement coordinate system and said infrared camera coordinate system, said three-dimensional color coordinates of said three-dimensional object in said marker measurement coordinate system at said first time, so as to obtain three-dimensional color coordinates of said three-dimensional object in said infrared camera coordinate system at said first time; and
    generating a three-dimensional point cloud image of said three-dimensional object in said infrared camera coordinate system at said first time by combining said three-dimensional shape coordinates of said three-dimensional object in said infrared camera coordinate system at said first time and said three-dimensional color coordinates of said three-dimensional object in said infrared camera coordinate system at said first time.

2. The method according to claim 1, further comprising a step of calibrating said first conversion relationship parameter, wherein said step of calibrating said first conversion relationship parameter comprises:
    calibrating a third conversion relationship parameter between a color camera coordinate system of a color camera and said marker measurement coordinate system;
acquiring, by said color camera, a two-dimensional color image of said three-dimensional object at a second time, and in the case where said three-dimensional object and said marker set form said first rigid body, detecting, by said marker measurement device, three-dimensional marker coordinates of said marker set in said marker measurement coordinate system at said second time;
    determining, on the basis of said two-dimensional color image of said three-dimensional object at said second time, three-dimensional color coordinates of said three-dimensional object in the color camera coordinate system at said second time;
converting, according to said third conversion relationship parameter, said three-dimensional color coordinates of said three-dimensional object in said color camera coordinate system at said second time, so as to obtain three-dimensional color coordinates of said three-dimensional object in said marker measurement coordinate system at said second time; and
    calibrating, on the basis of the three-dimensional marker coordinates of said marker set in said marker measurement coordinate system at said second time and the three-dimensional color coordinates of said three-dimensional object in said marker measurement coordinate system at said second time, the first conversion relationship parameter between the three-dimensional marker coordinates of said marker set and the three-dimensional color coordinates of said three-dimensional object.

3. The method according to claim 2, wherein said step of calibrating a third conversion relationship parameter between a color camera coordinate system of a color camera and said marker measurement coordinate system comprises:
    in the case where said marker set is fixed on a calibration plate to form a second rigid body, acquiring, by said color camera, a two-dimensional color image of said marker set at a third time, and detecting, by said marker measurement device, three-dimensional marker coordinates of said marker set in said marker measurement coordinate system at said third time;

determining, on the basis of said two-dimensional color image of said marker set at said third time, three-dimensional marker coordinates of said marker set in said color camera coordinate system at said third time; and calibrating, on the basis of the three-dimensional marker coordinates of said marker set in said color camera coordinate system at said third time and the three-dimensional marker coordinates of said marker set in said marker measurement coordinate system at said third time, the third conversion relationship parameter between said color camera coordinate system of said color camera and said marker measurement coordinate system.

4. The method according to claim 1, further comprising a step of calibrating said second conversion relationship parameter, wherein said step of calibrating said second conversion relationship parameter comprises:

in the case where said marker set is fixed on the calibration plate to form a third rigid body, detecting, by said infrared camera, three-dimensional marker coordinates of said marker set in said infrared camera coordinate system at a fourth time, and detecting, by said marker measurement device, three-dimensional marker coordinates of said marker set in said marker measurement coordinate system at said fourth time; and calibrating, on the basis of said three-dimensional marker coordinates of said marker set in said infrared camera coordinate system at said fourth time and said three-dimensional marker coordinates of said marker set in said marker measurement coordinate system at said fourth time, the second conversion relationship parameter between said marker measurement coordinate system and said infrared camera coordinate system.

5. The method according to claim 1, wherein said first rigid body is composed of a first sub-rigid body and said three-dimensional object, and said first sub-rigid body is formed by arranging said plurality of markers comprised in said marker set in a non-collinear manner at a predetermined position of said three-dimensional object.

6. The method according to claim 3, wherein said second rigid body is composed of a second sub-rigid body and said calibration plate, and said second sub-rigid body is formed by arranging said plurality of markers comprised in said marker set in a non-collinear manner on said calibration plate.

7. The method according to claim 3, wherein said third rigid body is composed of a third sub-rigid body and said calibration plate, and said third sub-rigid body is formed by arranging said plurality of markers comprised in said marker set in a non-collinear manner on said calibration plate.

8. An apparatus for generating a three-dimensional point cloud image, said apparatus comprising:

a data detection module, configured to detect, by an infrared camera, three-dimensional shape coordinates of a three-dimensional object in an infrared camera coordinate system at a first time, and in the case where said three-dimensional object and a marker set form a first rigid body, detect, by a marker measurement device, three-dimensional marker coordinates of said marker set in a marker measurement coordinate system at said first time, said marker set comprising a plurality of markers;

a first coordinate conversion module, configured to determine, according to a pre-stored first conversion relationship parameter between the three-dimensional marker coordinates of said marker set and three-dimensional color coordinates of said three-dimensional object, and said three-dimensional marker coordinates of said marker set in said marker measurement coordinate system at said first time, three-dimensional color coordinates of said three-dimensional object in said marker measurement coordinate system at said first time;

a second coordinate conversion module, configured to convert, according to a pre-stored second conversion relationship parameter between said marker measurement coordinate system and said infrared camera coordinate system, said three-dimensional color coordinates of said three-dimensional object in said marker measurement coordinate system at said first time, so as to obtain three-dimensional color coordinates of said three-dimensional object in said infrared camera coordinate system at said first time; and a three-dimensional point cloud image generation module, configured to generate a three-dimensional point cloud image of said three-dimensional object in said infrared camera coordinate system at said first time by combining said three-dimensional shape coordinates of said three-dimensional object in said infrared camera coordinate system at said first time and said three-dimensional color coordinates of said three-dimensional object in said infrared camera coordinate system at said first time.

9. A computer device, comprising a memory and a processor, wherein said memory stores a computer program, and when said processor executes said computer program, the steps of the method according to claim 1 is implemented.

10. A non-transitory computer-readable storage medium, on which a computer program is stored, wherein said computer program, when executed by a processor, implements the steps of the method according to claim 1.

* * * * *